United States Patent [19]
Piasecki

[11] Patent Number: 5,277,381
[45] Date of Patent: Jan. 11, 1994

[54] ROTARY WING AIRCRAFT SHROUDED PROPELLER SIDEWALL THRUSTER

[75] Inventor: Frederick W. Piasecki, Haverford, Pa.

[73] Assignee: Piasecki Aircraft Corporation, Essington, Pa.

[21] Appl. No.: 928,307

[22] Filed: Aug. 12, 1992

[51] Int. Cl.$^5$ .............................................. B64C 27/82
[52] U.S. Cl. .................................. 244/17.19; 244/51; 244/23 D
[58] Field of Search ................. 244/17.11, 17.19, 51, 244/52, 23D, 12.5; 239/265.33, 265.35, 265.37

[56] References Cited

U.S. PATENT DOCUMENTS

| | | | |
|---|---|---|---|
| 1,344,518 | 6/1920 | Rees | 244/52 |
| 3,148,848 | 9/1964 | Price | 244/52 |
| 3,260,482 | 7/1966 | Stroukoff | 244/17.19 |
| 3,807,662 | 4/1974 | Nelazquez | 244/17.19 |
| 5,131,603 | 7/1992 | Meyers | 244/17.19 |

*Primary Examiner*—Galen L. Barefoot
*Attorney, Agent, or Firm*—Willard M. Hanger

[57] ABSTRACT

An improved rotary wing aircraft shrouded propeller ducted tail assembly utilizing the flow pattern of the propeller slip stream exiting from the outlet end of the duct for flight control by means of movable slip stream deflecting surfaces. Three vertically extending deflecting surfaces are pivotally supported at the outlet end of the duct rearwardly of the propeller comprising a vertically extending, elongated rudder surface pivotally supported for rotation about a vertical axis on the duct centerline and a pair of duct sidewall flaps each pivotally supported by hinges mounted on the respective opposite duct lateral sidewalls for obtuse angular rotation between a position extending outwardly and perpendicularly of the duct sidewall on which it is hinged and a position extending through an opening in the duct sidewall of which it is hinged to protrude transversely of the duct interior. The positions of the three deflecting surfaces are established by a control mixing unit which concurrently positions all three surfaces to extend transversely of the duct longitudinal axis in the same direction on either side of the duct longitudinal axis for hover flight, concurrently positions all three surfaces to extend parallel to the duct sidewalls and longitudinal axis for high speed cruising flight and concurrently positions each of the pair of duct sidewall flaps to extend through an opening in the duct sidewall on which it is hinged to protrude transversely into the duct interior with the rudder surface coincident with the duct longitudinal axis for decelerating high speed cruising flight.

5 Claims, 3 Drawing Sheets

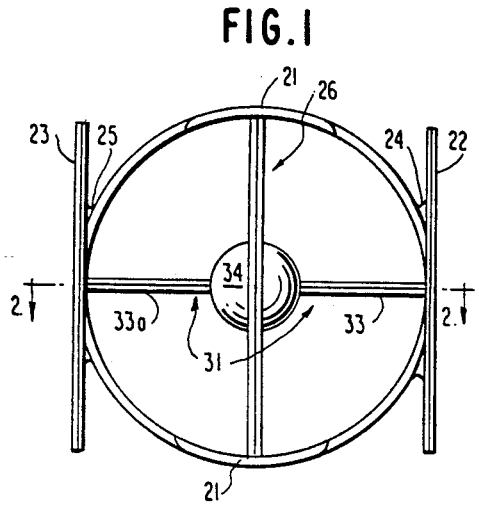
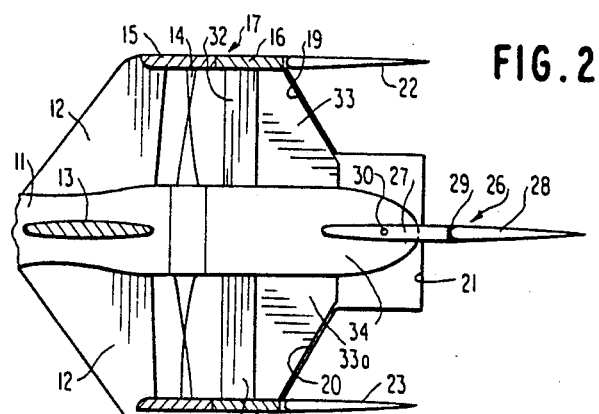
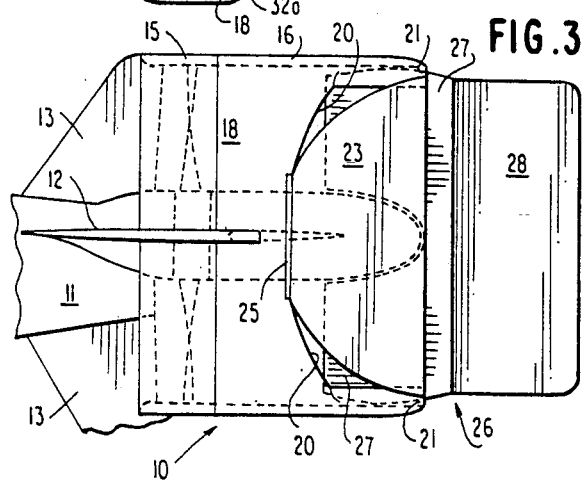
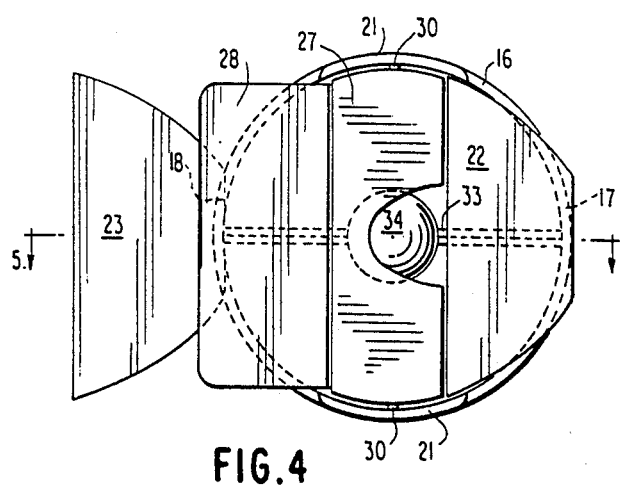
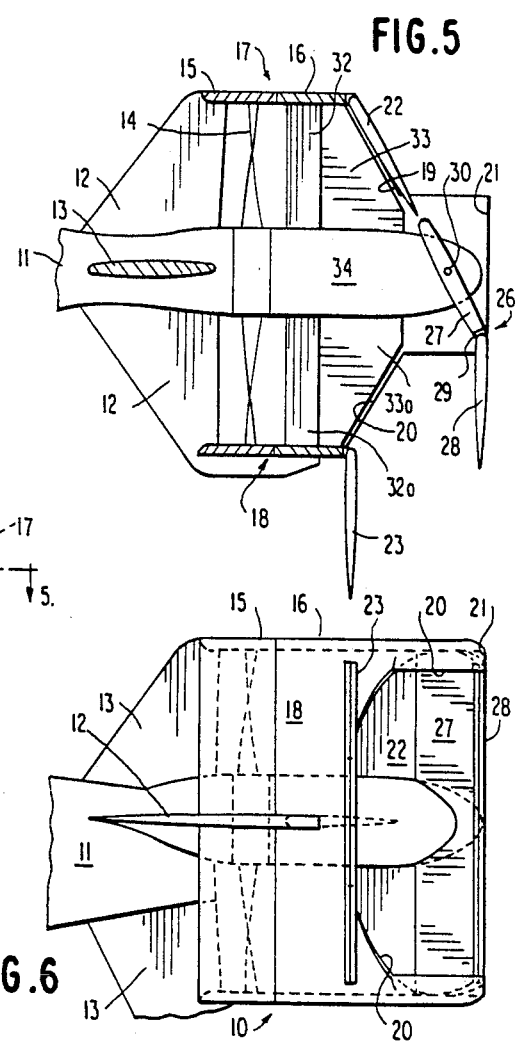
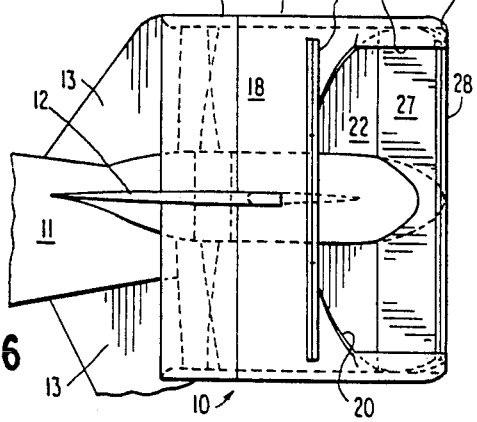

ROTARY WING AIRCRAFT SHROUDED PROPELLER SIDEWALL THRUSTER

BACKGROUND OF THE INVENTION

This invention is a variation of and an improvement over prior known vector thrust ducted propeller tail assemblies in which pivotable surfaces of the ducted tail rearwardly of the shrouded propeller deflect the propeller slip stream exiting from the rear of the duct in establishing a directional thrust for controlling yaw and flight condition of a rotary wing aircraft. This concept is most useful when utilized in a compound rotary wing aircraft in which the rotor is unloaded at a high speed cruising condition in which the fixed wing of the aircraft provides lift and the shrouded propeller provides forward thrust to the aircraft.

A number of patents have been issued directed to varying configurations of propeller slip stream deflecting surfaces that establish a rotor torque counterbalancing moment of the necessary magnitude required for yaw control and maintain the desired aircraft heading, U.S. Pat. Nos. 4,905,932; 3,260,482; 3,241,791 and 3,222,012 being typical. Although the ducted propeller ring tail configurations of these patents are suitable to establish a sufficiently high rate of turn of the aircraft both to the right and to the left in most situations, as explained in more detail in the Meyer U.S. Pat. No. 5,131,603 assigned to the assignee of this application, under low rotor shaft torque conditions rotor torque can be insufficient to establish a sufficiently high aircraft turning rate in the direction of rotor rotation for the aircraft to fulfill its mission. The invention of this application is directed to solving the same problems and improving the maneuverability of shrouded propeller ring tail aircraft as in U.S. Pat. No. 5,131,603 in which the combination of a shrouded propeller and duct deflecting surfaces creates a thrust force that can be exerted through a rearwardly extending arc of 180°. In the invention of this application, a configuration of the pivotable duct deflecting surfaces captures the entire propeller slip stream and directs the exit flow in a manner as creates a smoother flow pattern with lesser turbulence and greater aerodynamic efficiency than the configuration of U.S. Pat. No. 5,131,683.

SUMMARY OF THE INVENTION

The slip stream deflecting surfaces at the rear outlet section of the shrouded propeller duct comprise three vertically extending surfaces that are pivotable about a vertical axis. An elongated rudder surface, preferably comprising intercoupled rudder panels, of which the camber changes when rotated is pivotally supported about a vertical axis on the duct longitudinal axis at the rear open end of the duct for rotation of the rudder surface between a neutral position coextensive with the axis of the duct and deflected positions extending transversely of the duct interior on both sides of the duct axis. A pair of vertically extending sidewall flaps are supported by vertical hinges mounted on opposite lateral sidewalls of the duct immediately forward of outlet openings in the rear portion of the duct. Each flap is pivotally supported for rotation about a vertical axis through an obtuse angular arc between an outwardly displaced position extending perpendicularly outwardly of the duct sidewall and an inwardly displaced position protruding through an outlet side opening in the duct rear sidewall portion to extend inwardly into and transversely of the duct interior. A control mixing unit, which establishes the respective positions of the three deflecting surfaces, concurrently aligns the three deflecting surfaces such that all three extend transversely of the duct longitudinal axis in the same direction on either side of the duct axis for deflecting the propeller slip stream either to the right or to the left in hovering flight as required for counteracting rotor torque and providing yaw control in the desired direction. In a preferred embodiment, the configuration of the flaps and the multi-panel rudder surface are such that in the hovering flight condition, the sidewall flaps extending inwardly of the duct and the forward rudder panel are aligned and in proximity as establishes a smoothly curved, transversely directed exit flow of the propeller slip stream. For high speed cruising flight, the control mixing unit establishes the three surfaces in positions aligned parallel to the direction of the duct axis with deflections of the centerline rudder surface from the neutral position controlling the aircraft in yaw. For a cruising flight decelerating condition, the control mixing units establish the rudder surface in its neutral position and establish the flaps in a displaced position in which both flaps extend through the duct side outlet opening inwardly into and transversely of the duct interior.

The primary object of the invention is to improve the efficiency of yaw control of rotary wing aircraft in hovering flight.

A further object of the invention is to improve the maneuvering agility of rotary wing aircraft.

Still a further object of the invention is to provide turning torque for a rotary wing aircraft additional to that provided by rotor torque when the aircraft is being yawed in the direction of rotor rotation.

Yet still another object of the invention is to improve the speed retardation rate of a compound rotary wing aircraft in a rotor unloaded condition during high speed cruising flight.

BRIEF DESCRIPTION OF THE DRAWINGS

FIG. 1 is an elevation of the tail assembly of a rotary wing aircraft with the structural components positioned for high speed cruising flight.

FIG. 2 is a plan view along section line 2—2 of FIG. 1.

FIG. 3 is a side elevation of the configuration of FIG. 1.

FIG. 4 is a rear elevation of the tail assembly of a counterclockwise rotating rotor aircraft with the structural components positioned for normal hovering flight.

FIG. 5 is a plan view along section line 5—5 of FIG. 4.

FIG. 6 is a side elevation of the configuration of FIG. 4.

DETAILED DESCRIPTION OF THE INVENTION

Figure 8:
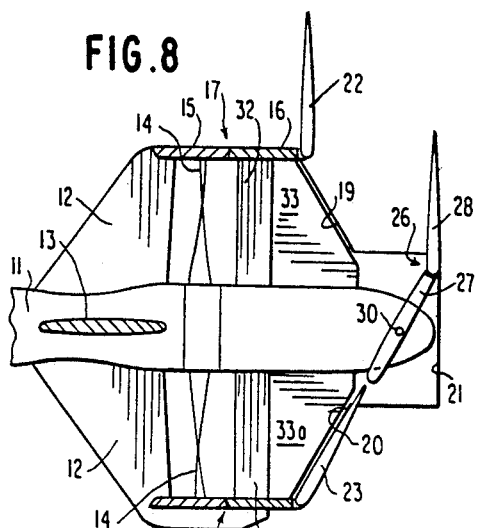
FIG. 8 is a plan view along section lines 8—8 of FIG. 7.

The positions of the structural components of the tail assembly illustrated in FIGS. 1-12 are those required for a conventional single rotor compound rotary wing aircraft and those illustrated in FIGS. 4-9 are for a counterclockwise rotating rotor aircraft operating in a hovering flight condition. Obviously, the positions of the pivoting structural tail components for a rotary wing aircraft with a clockwise rotating rotor would be reversed from those illustrated in FIGS. 4-9.

First referring to FIGS. 1-3, an annular duct 10 is supported on the rear of the rotary wing aircraft fuselage 11 by a horizontal stabilizer 12 and vertical stabilizer 13 with a controllable pitch propeller 14 mounted for rotation within the interior of the duct forward inlet portion 15. The duct rear outlet portion 16 has opposite lateral sidewalls 17, 18 each of which contains a sidewall opening 19, 20 extending to the rear end 21 of the duct. A pair of vertically extending sidewall flaps 22, 23 are pivotally attached to the respective duct lateral sidewalls 17, 18 by vertically extending hinges 24, 25 located midway of the respective duct lateral sidewalls 17, 18 at the forwardmost end of each sidewall opening 19, 20. An elongated rudder surface assembly 26, comprising a tandemly arranged pair of rudder panels 27, 28 having a pivotal connection 29, is pivotally supported for rotation about a vertical axis by a pivot arm 30 pivotally connecting the forward rudder panel 27 to the top and bottom of the duct rear end 21. A linkage arrangement, which can be of the general nature of the one disclosed in U.S. Pat. No. 3,260,482, intercouples the rudder panels 27, 28 in a manner that rotation of the forward rudder panel 27 about the rudder pivot arm 30 establishes a differential angular relationship between the two rudder panels establishing a variable camber of the rudder surface assembly 26 when deflected. A split horizontal elevator assembly 31 comprising horizontal stabilizers 32, 32a and movable surfaces 33, 33a extend from the propeller hub fairing 34 across the interior of the duct to the respective duct lateral sidewalls 17, 18.

In the same general manner as in U.S. Pat. Nos. 5,131,603 and 4,905,932, the components of the shrouded propeller ring tail structure of this invention are positioned and controlled by remote pilot-operated controls in a manner that will establish yaw control of the aircraft in both hovering and high speed cruising flight. As in the cited patents for hovering flight, pivotable deflecting surfaces rearward of the propeller are positioned so as to deflect the propeller slip stream transversely of the aircraft in establishing transversely directed thrust of the magnitude necessary for yaw control in maintaining the desired heading, the magnitude of this transverse thrust being controlled by the pitch of the propeller which is established by movement of the pilot operated rudder pedals. In cruising high speed flight with the rotor unloaded the ring tail pivoting surfaces of the duct rearwardly of the propeller are aligned generally longitudinally of the duct so as not to change the flow direction of the slip stream, movement of the pilot operated rudder pedals deflecting a rudder surface from a neutral position sufficiently to establish necessary yaw control in the normal manner of conventional fixed wing aircraft. For this high speed cruising condition the propeller is set in the high pitch range so as to develop aircraft forward thrust to the degree that the propeller can absorb maximum engine power. As in U.S. Pat. No. 5,131,603, the pivotable slip stream deflecting surfaces of the ring tail structure of this invention provide augmented thrust in the direction of rotor torque when a higher turning rate in this direction is required and also provide augmented retardation of forward speed when the aircraft is operating in the cruising speed mode.

Figure 13:
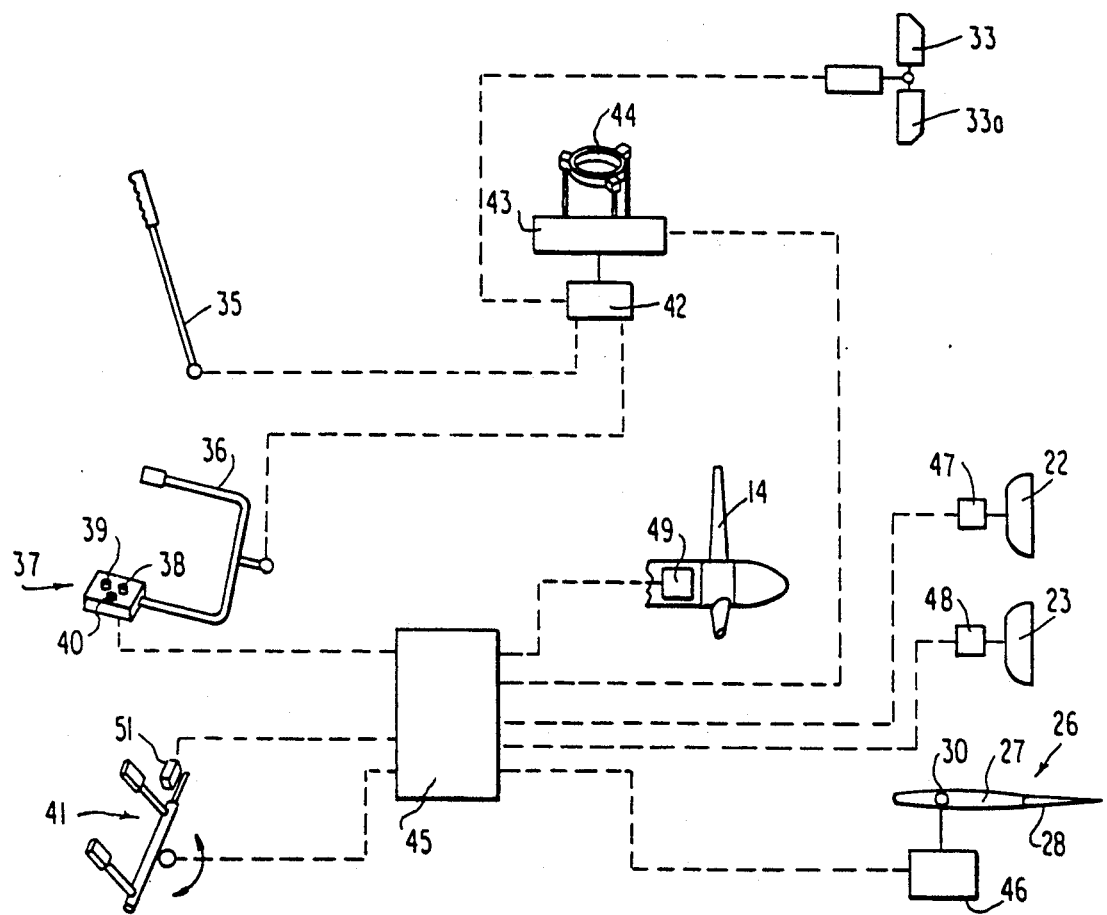
FIG. 13 is a schematic diagram of the control system by which the tail assembly components of this invention are operated and controlled.

A control system for establishing the positions and movements of the components of this improved ring tail structure is schematically represented in FIG. 13, the control components being generally similar to that described for U.S. Pat. No. 5,131,603 with suitable modifications due to differences in the propeller slip stream deflecting surfaces of this invention. The pilot's controls are generally conventional in nature comprising a cyclic control stick 35, a collective pitch control lever 36, a 3-way flight control box 37 mounting propeller pitch range control buttons 38, 39 and speed retardation switch 40 and rudder pedals 41. The flight control box 37, conveniently mounted on the collective pitch control lever 36, includes the two propeller pitch range control switches 38, 39 corresponding to those of a conventional propeller pitch control beeper switch of a rotary wing aircraft of which actuating the high pitch range switch 39 sets the propeller pitch in the high pitch range required for high speed cruising and actuating low pitch range switch 39 sets the propeller pitch in the low pitch range required for low speed and hovering flight. The speed retardation switch 40 mounted on the flight control box controls the position of the propeller slip stream deflecting surfaces in a manner to be subsequently described. The control system components connected between the pilot's controls and the actuators for the main rotor swash plate, the propeller pitch control mechanism and the aircraft aerodynamic control surfaces can be generally similar to conventional rotary wing aircraft controls of the type described in U.S. Pat. No. 3,332,643. In such a system, a rotor pitch mixing assembly 42 and rotor phase-out assembly 43 in series between the cyclic control stick 35 and the collective pitch control lever 36 transmit flight control signals to the actuators of the rotor swash plate 44. A primary control mixing unit 45 (preferably a computer) performs the function of a conventional rudder ratio control in establishing a variable ratio of pilot rudder pedal movement to propeller slip stream deflecting surface movement dependent upon the settings of the propeller pitch control switches 38, 39 as required for hover flight or for high speed cruising flight. The primary control mixing unit 45 receives input signals from connections to the propeller pitch control switches 38, 39 and the rudder pedals 41 that create output signals through connections to the actuator 46 of the rudder surface 26, the actuators 47, 48 of the respective sidewall flaps 22, 23 and the propeller pitch control actuator 49 which establish the rudder surface and sidewall flaps in the positions subsequently described. The connection between the primary control mixing unit 45 and the rotor phase-out assembly 43 is to phase out rotor pitch signals received from the rotor pitch mixing assembly 42 in the conventional manner to transmit signals to the actuator 50 of the movable elevator surfaces 33, 33a when the high pitch range switch 39 is actuated for establishing the cruising flight condition. The function of an accelerating right turn switch 51 connected to the primary control mixing unit 45 will be subsequently described.

Refer now to FIGS. 1-3 illustrating the position in which the slip stream deflecting surfaces are deployed when the aircraft operates in the high speed cruising range with the rotor unloaded and forward aircraft thrust is provided by the shrouded propeller 14. With the propeller pitch control switch 38 actuated to set the propeller 14 in the high pitch range, the primary control mixing unit 45 generates signals to the flap actuators 47, 48 positioning the flaps 22, 23 in a trailing position parallel to the longitudinal axis of the duct 10 and generates signals to the rudder surface actuator 46 positioning the rudder panels 27, 28 in tandem establishing the rudder surface in a neutral position parallel to the duct axis. In this propeller high pitch range, the signals generated by the primary control mixing unit 45 to the rudder surface actuator 46 establish a direct ratio between rudder pedal movement and pivotal deflection movement of the rudder surfaces 26 to either side of a neutral position coextensive with the duct longitudinal axis. In this high pitch range of the propeller the primary control mixing unit 45 phases out rotor pitch signals to the rotor swash plate 46 so that control of the aircraft in pitch and roll is established by signals generated by movement of the cyclic pitch control stick 35 and transmitted to the elevator actuator 50.

FIGS. 4-6 illustrate the positions of the ring tail assembly slip stream deflecting surfaces of this invention for a counterclockwise rotating rotor rotary wing aircraft operating in a low speed and hovering flight condition. Upon actuating the propeller pitch control switch 38 to set the propeller in the low pitch range, the primary control mixing unit 45 generates signals to the flap actuators 47, 48 positioning the respective sidewall flaps 22, 23 into displaced positions extending transversely of the duct longitudinal axis in the same direction, best seen in FIG. 5, in which the left sidewall flap 23 extends from its hinge perpendicularly outwardly of the left lateral duct sidewall 18 and the right sidewall flap 22 extends from its hinge into and transversely of the duct interior. Concurrently, the mixing unit 45 generates a signal to the rudder surface actuator 46 rotating the forward rudder panel 27 along with the pivotally interconnected rear rudder panel 28 to the illustrated fully deflected position lying transversely of the duct interior with the trailing end of the rear rudder panel 28 adjacent the left lateral duct sidewall 18. The dimensions of the sidewall flaps and the forward rudder panel are such that in this illustrated slip stream deflecting position, the trailing edge of the inwardly displaced right sidewall flap 22 and the leading edge of the forward rudder panel 27 are in close proximity with the sidewall flap 22 and forward rudder panel 27 tandemly aligned in a manner that the combined surface of flap 23 and cambered rudder panels 27, 28 establish a substantially continuous curved surface extending across the outlet end portion of the duct interior. As best seen in FIG. 5, the substantially continuous tandem array of the displaced right flap 22 and fully deflected cambered rudder surface 26 extending transversely across substantially the entire span of the duct outlet rearwardly of the displaced left flap 23 extending perpendicularly outwardly from the duct left lateral sidewall establishes a smoothly curved channel along which the propeller slip stream is diverted to exit through the left duct sidewall opening 20 transversely of the duct axis creating a starboard rotor torque counterbalancing thrust force of which the magnitude is established by the propeller pitch controlled by rudder pedal position in the manner previously noted.

Figure 7:
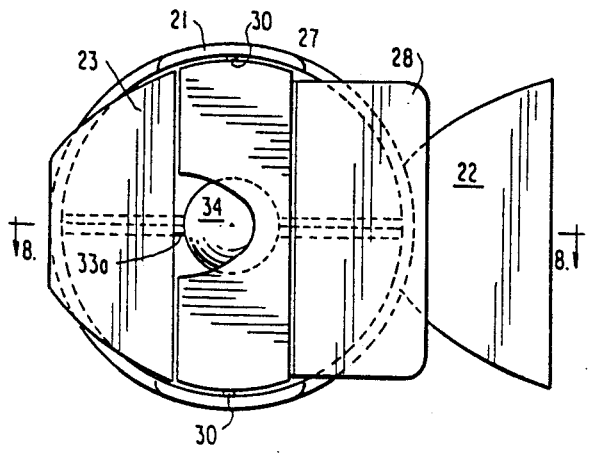
FIG. 7 is a rear elevation of the tail assembly of a counterclockwise rotor rotating aircraft with the structural components positioned for an augmented right turning rate during hovering flight.
Figure 9:
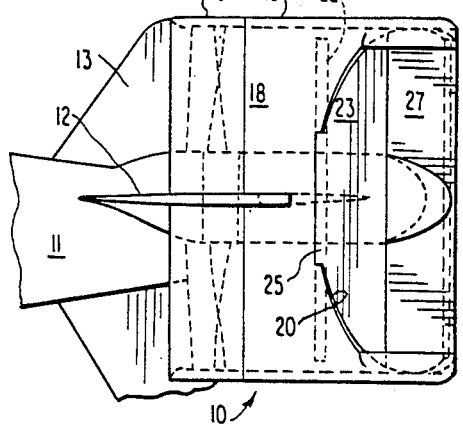
FIG. 9 is a side elevation of the configuration of FIG. 7.

Under low rotor torque flight conditions when an accelerated right turning rate of the counterclockwise rotor rotating aircraft is required, by applying maximum right rudder pedal movement the accelerating right turn switch 51 is actuated which causes the control mixing unit 45 to generate signals to the actuators 46, 47, 48 of the rudder surface assembly 26 and the flaps 22, 23 that cause these slip stream deflecting surfaces to be deployed to the alternate position illustrated in FIGS. 7-9. In this alternate position, the deflecting surfaces extend transversely of the access of the duct in the direction opposite to that of the normal hovering position illustrated in FIGS. 4-6. In this alternate position, the propeller slip stream is channeled to exit through the right duct sidewall opening 19 so as to establish a port thrust which augments the torque of the counterclockwise rotating rotor and accelerates a right turning yaw movement of the aircraft. Upon applying a diminishing hard right rudder pedal movement, the accelerating right turn switch 51 is disengaged and the control mixing unit 43 generates signals to the rudder and flap actuators returning the rudder surface assembly 26 and the flaps 22, 23 to the normal hovering flight positions illustrated in FIGS. 4-6.

Figure 11:
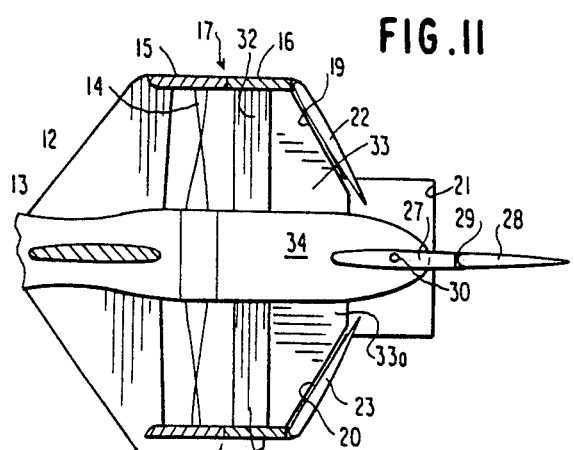
FIG. 11 is a plan view along section line 11—11 of FIG. 10.
Figure 10:
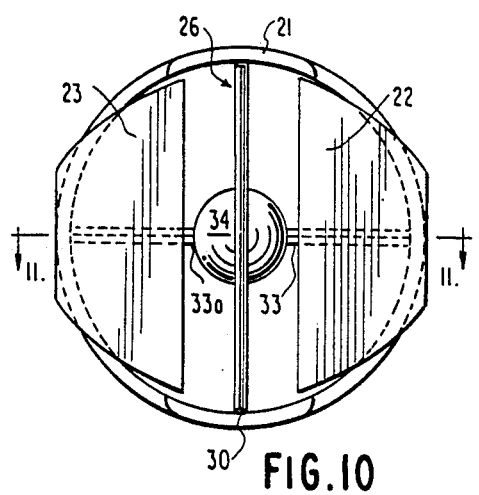
FIG. 10 is a rear elevation of the tail assembly of a rotary wing aircraft with the structural components positioned for retardation of high speed cruising flight.
Figure 12:
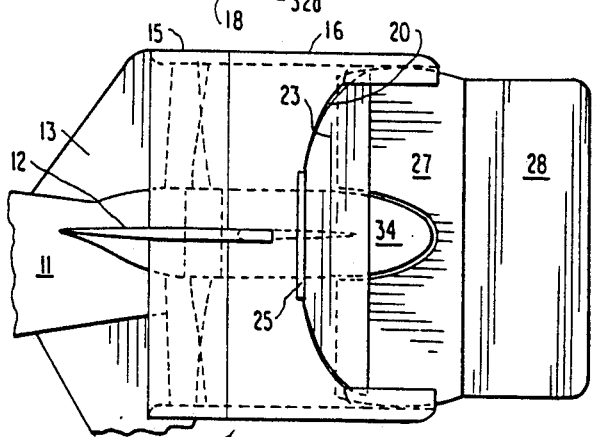
FIG. 12 is a side elevation of the configuration of FIG. 10.

FIGS. 10-12 illustrate third alternate positions in which the propeller slip stream deflecting surfaces can be deployed for the purpose of augmenting deceleration of the aircraft during high speed cruising flight when the high pitch range switch 39 has been actuated and thrust of the propeller 14 propels the aircraft. Actuating the speed retardation switch 40 of the flight control box 37 generates signals from the control mixing unit 45 to the flap actuators 47, 48 that deploy the sidewall flaps 22, 23 to the illustrated third alternate position, most easily seen in FIG. 11. In this position both flaps 22, 23 are deployed to extend toward each other inwardly of the duct lateral sidewalls 17, 18 across the interior of the duct inside the duct sidewall outlet openings 19, 20 establishing a barrier at the exit end of the duct 10 which obstructs slip stream exit flow and creates turbulence markedly decreasing thrust generated by the propeller.

It should be understood that the foregoing disclosure illustrates a typical preferred embodiment of the invention and that numerous modifications or alterations may be made therein without departing from the spirit and scope of the invention as set forth in the appendant claims.

What is claimed is:

1. A rotary wing aircraft tail assembly comprising:
   an annular duct having a forward inlet portion and a rear outlet portion between which a propeller is mounted for rotation concentrically of the interior of said duct,
   a vertically extending rudder surface of which the length dimension is substantially as great as the distance between said duct outlet end portion sidewall and said duct axis,
   means pivotally supporting said rudder surface from said duct outlet portion for revolving movement between a neutral position in which said rudder surface is coincident with the longitudinal axis of said duct and deflected positions in which said rudder surface is angularly disposed transversely of said duct longitudinal axis, means positioning said rudder surface into said neutral and deflected positions, each lateral sidewall of the rearmost portion of said duct outlet portion comprising a pivotally supported, vertically extending flap of which the length dimension closely approximates the distance between said duct outlet end portion sidewall and said duct axis, hinge means on each opposite lateral sidewall of said duct outlet portion forwardly of said flap pivotally supporting each said flap for rotation about a vertical axis between a retracted position extending parallel to said duct longitudinal axis and a plurality of displaced positions extending transversely of said duct longitudinal axis, means positioning said flaps into said displaced and retracted positions and means interconnecting said flap and rudder positioning means actuating said positioning means respectively in a manner as (1) positions said rudder surface into a fully deflected position in which the trailing edge of said rudder surface is adjacent an extension of a duct lateral sidewall concurrently with said flaps being positioned into a first displaced position in which each said flap extends from its supporting hinge means in the same direction transversely of said duct axis and (2) positions said rudder surface in said neutral position concurrently with (a) said flaps being positioned into a second displaced position in which each said flap extends from its supporting hinge means in opposite directions transversely of said duct axis and (b) said flaps being positioned into said retracted position.

2. The rotary wing aircraft tail assembly of claim 1 wherein said interconnecting means actuates said positioning means in a manner that said rudder surface in said fully deflected position extends transversely of said duct axis in the same transverse direction to said duct axis as said flaps positioned in said first displaced position.

3. The rotary wing aircraft tail assembly of claim 2 wherein said rudder surface pivotal support means is located rearwardly of said flap hinge means.

4. The rotary wing aircraft tail assembly of claim 3 wherein said flaps are configured as establishes the trailing edge of one of said flaps in close adjacency to the forwardmost edge of said rudder surface when said flaps are in said first displaced position.

5. The rotary wing aircraft tail assembly of claim 1 wherein said rudder surface comprises a plurality of adjoining rudder panels arranged in tandem, means pivotally connecting each said rudder panel to an adjoining rudder panel and means intercoupling said rudder panels establishing differential angular rotation of adjoining rudder panels about said pivotal connecting means upon revolving movement of said rudder surface about said pivotal support means.

* * * * *